United States Patent [19]

Dietz et al.

[11] Patent Number: 5,275,653
[45] Date of Patent: Jan. 4, 1994

[54] PIGMENT PREPARATIONS BASED ON DIOXAZINE COMPOUNDS

[75] Inventors: Erwin Dietz, Kelkheim; Manfred Urban, Wiesbaden, both of Fed. Rep. of Germany

[73] Assignee: Hoechst Aktiengesellschaft, Gebaeude, Fed. Rep. of Germany

[21] Appl. No.: 855,329

[22] Filed: Mar. 20, 1992

[30] Foreign Application Priority Data

Mar. 22, 1991 [DE] Fed. Rep. of Germany ....... 4109489

[51] Int. Cl.$^5$ .................. C07D 498/22; C07D 265/38; C09D 11/02
[52] U.S. Cl. ................................. 106/498; 106/22 H; 106/23 H; 106/493; 106/494; 544/64; 544/73; 544/74; 544/99
[58] Field of Search ...................... 544/64, 73, 74, 99; 106/22 H, 23 H, 493, 494, 498

[56] References Cited

U.S. PATENT DOCUMENTS

| | | |
|---|---|---|
| 4,310,359 | 1/1982 | Ehashi et al. . |
| 4,317,682 | 3/1982 | Katsura et al. . |
| 4,668,774 | 5/1987 | Loeffler et al. ..................... 534/728 |
| 4,986,852 | 1/1991 | Dietz et al. .......................... 106/498 |

FOREIGN PATENT DOCUMENTS

| | | |
|---|---|---|
| 2013679 | 10/1990 | Canada . |
| 0163113 | 12/1985 | European Pat. Off. . |
| 0321919 | 6/1989 | European Pat. Off. . |
| 3106906 | 5/1990 | Fed. Rep. of Germany . |
| 3031301 | 7/1990 | Fed. Rep. of Germany . |
| 0395988 | 11/1990 | Fed. Rep. of Germany . |

OTHER PUBLICATIONS

Complete English translation of laid-open Japanese Patent Application Kokai No. 102272/1990. Apr. 13, 1990.
Complete English translation of laid-open Japanese Patent Application Kokai No. 102273/1990. Apr. 13, 1990.

*Primary Examiner*—Mark L. Bell
*Assistant Examiner*—Scott L. Hertzog
*Attorney, Agent, or Firm*—Connolly and Hutz

[57] ABSTRACT

In order to improve the application properties, in particular the rheological and coloristic properties, and the gloss behavior and the flocculation stability of dioxazine pigments in acrylic varnishes, the surface of the base pigment is modified by coating with sulfo-containing dioxazine derivatives, which in most cases have been converted into the corresponding metal salts, into specific salt-like derivatives derived therefrom or, if desired, into cyclic ammonium compounds. Such a modification of the base pigment, i.e. production of the pigment preparations according to the invention by adding the specific dispersant, can take place at the stage of the pigment synthesis, during a comminution process of the coarse-crystalline crude pigment, by addition to the already finely divided crude pigment in the course of a subsequent solvent finish treatment or by mechanical mixing of the two essential components, pigment and dispersant.

10 Claims, No Drawings

PIGMENT PREPARATIONS BASED ON DIOXAZINE COMPOUNDS

DESCRIPTION

The present invention relates to new pigment preparations having improved coloristic and rheological properties, to a process for their preparation and to their use for pigmenting high-molecular-weight materials.

The organic pigments obtained after synthesis or finishing are in many cases unsuitable for being used directly for pigmenting high-molecular-weight materials. This often leads to difficulties, such as, for example, incomplete dispersion and flocculation, as a result of which optimum color strength and required fineness are then not reached. Insufficiently dispersed pigments can also be troublesome during further processing, and this fact in particular can easily lead to sedimentation problems in low-viscous systems. Furthermore, flocculations during dispersion, storage or further processing cannot be ruled out, leading to undesirable rheological modifications of the system and to surface defects, losses in color strength and gloss of the film applied.

In order to improve the properties of pigments in practical application, it is therefore advantageous to produce pigment preparations, by addition of pigment dispersants to the crude synthesis product or prefinished product, which show a distinct improvement in quality compared with the corresponding base pigment. In this respect, a number of proposals for influencing the rheological properties of pigments have been made, which however do not always give the desired result:

Thus, for example, U.S. Pat. No. 4,310,359 discloses that pigment preparations having excellent coloristic properties are obtained by mixing pigments with pigment derivatives having an analogous structure and being substituted by introducing a sulfonamide radical into the corresponding molecule. However, the pigment preparations based on C.I. Pigment Violet 23 mentioned there show substantial coloristic defects when incorporated in varnishes, in particular in acrylic/melamine varnishes.

Furthermore U.S. Pat. No. 4,317,682 has disclosed pigment preparations which comprise a pigment and a sulfonamido-containing colorless aromatic compound of non-identical structure. However, pigment preparations of this type do not fulfill the requirements with respect to the rheological and coloristic properties.

Finally, the laid-open EP-PA 0,163,113 describes colored salts of anionic dyes based on dioxazine compounds and secondary amines, which can be used for coloring paper. Colored salts of this type have hitherto not been used for pigment preparation.

Given the experience of the prior art discussed above, the object of the invention defined below was accordingly the further development of pigment preparations of the dioxazine type modified for their intended area of application.

In achieving this object, it has now been found that by treating the starting pigments with product-specific pigment dispersants based on salt-like sulfonic acid derivatives of dioxazine compounds, it is possible to give them application properties which exceed the prior art. The pigment preparations produced in this manner are distinguished by easy dispersibility, high flocculation stability and excellent rheological and coloristic properties when incorporated in acrylic varnishes.

Accordingly, the invention relates to pigment preparations comprising a) a dioxazine compound of the formula I as base pigment

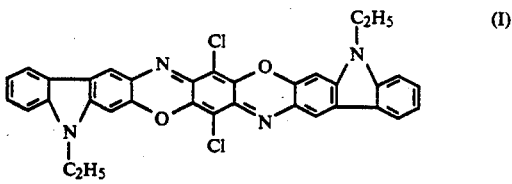

and, as pigment dispersant(s)

b) a dioxazine compound of the formula II

in which

Q is an n-valent radical of the base structure of the formula I;

$X^+$ is a hydrogen ion $H^+$ or the equivalent $M^{m+}/m$ of an m-valent metal cation, where m then is identically for the case in question one of the numbers 1, 2 or 3, such as, for example, $Li^{1+}$, $Na^{1+}$, $K^{1+}$, $Mg^{2+}$, $Ca^{2+}$, $Sr^{2+}$, $Ba^{2+}$, $Mn^{2+}$, $Cu^{2+}$, $Ni^{2+}$, $Cd^{2+}$, $Co^{2+}$, $Zn^{2+}$, $Fe^{2+}$, $Al^{3+}$, $Cr^{3+}$ or $Fe^{3+}$; or is an ammonium ion having the structure $N^+R^1R^2R^3R^4$, in which the substituents $R^1$, $R^2$, $R^3$ and $R^4$ on the quaternary nitrogen atom are individually and independently of one another each hydrogen or one of the groups $C_1$–$C_{30}$-alkyl, $C_2$–$C_{30}$-alkenyl or $C_5$–$C_{30}$-cycloalkyl, which may be substituted by hydroxyl, di-($C_1$–$C_4$-alkyl)amino, carboxyl or carboxamide, or furthermore is phenyl, $C_1$–$C_{18}$-alkyl-substituted phenyl or a (poly)alkyleneoxy group of the —$(CHR^5$—$CH_2$—O—$)_k$—H type, in which $R^5$ is hydrogen or $C_1$–$C_4$-alkyl and k is a number from 1 to 30;

or in which the substituents $R^1$ and $R^2$ jointly and together with the adjacent nitrogen atom can form an aliphatic, five- to seven-membered heterocyclic system, which, if desired, contains further hetero atoms, such as an oxygen, sulfur and/or nitrogen atom, belonging to the ring;

or in which the substituents $R^1$ and $R^2$ jointly and together with the adjacent nitrogen atom can form an aromatic, five- to seven-membered heterocyclic system, which, if desired, contains further hetero atoms, such as an oxygen, sulfur and/or nitrogen atom, belonging to the ring and, if desired, additionally benzo-fused rings, while each of the R's not participating in the ring formation in the two forms described above of the cyclic ammonium ion is hydrogen;

and in which n is a numerical value between 1 and 4; and/or c) a dioxazine compound of the formula III

in which

Q is an n-valent radical of the base structure of the formula I;

$Z^{r+}$ is the equivalent $M^{r+}$ of an r-valent metal cation, where r is then identically for the case in question the number 2 or 3, such as, for example, $Mg^{2+}$, $Ca^{2+}$, $Sr^{2+}$, $Ba^{2+}$, $Mn^{2+}$, $Cu^{2+}$, $Ni^{2+}$, $Cd^{2+}$, $Co^{2+}$, $Zn^{2+}$, $Fe^{2+}$, $Al^{3+}$, $Cr^{3+}$ or $Fe^{3+}$;

$Y^-$ is one of the anionic radicals $R^6$-$SO_3^-$ or $R^7$—COO$^-$, in which the substituents $R^6$ and $R^7$, independently of one another, are each one of the groups $C_1$-$C_{30}$-alkyl or $C_2$-$C_{30}$-alkenyl, which in turn are linear or branched and can be interrupted within the (one) chain by a bridge-forming grouping from the series comprising —O—, —NH—, —NR$^8$—, —S—, substituted or unsubstituted phenylene (in particular 1,4-phenylene), —CO—, —SO$_2$—, —CHR$^9$— or —CR$^9$R$^{10}$—, or by a combination of at least two such bridging members of different types, which, if desired, can be repeating, and in which $R^8$, $R^9$ and $R^{10}$ are identical or different $C_1$-$C_4$-alkyl, or furthermore is phenyl, $C_1$-$C_{30}$-alkyl- and/or $C_1$-$C_4$-alkoxy-substituted phenyl or a (poly)alkyleneoxy group of the —(CHR$^{11}$—CH$_2$—O—)$_k$—H type, in which $R^{11}$ is hydrogen or $C_1$-$C_4$-alkyl and k is a number from 1 to 30; and in which n is a numerical value between 1 and 4 and p is a numerical value which can be calculated from the difference $(r-1)$;

in which if components X, Y and Z are present more than once $(n>1)$ in the compounds of formulae II and/or III, the meanings of the symbols just mentioned do not have to be identical. Preferably however, if a number of salt radicals are present, they will correspond to each other as regards the structural principle.

In this context, in particular those pigment preparations should be pointed out according to the invention in which, apart from base pigment a) a dioxazine compound of the formula II mentioned at the beginning is present as pigment dispersant b), in which Q is as defined above, $X^+$ is a cation of the $H^+$ or $Ca^{2+}/2$ type or an ammonium ion of the structure $N^+H_3R^4$, in which $R^4$ is $C_{12}$-$C_{18}$-alkyl, such as, for example, a lauryl, palmityl or stearyl group, or $C_{16}$-$C_{18}$-alkenyl, such as, for example, an oleyl group, but in particular $C_{20}$-cycloalkyl based on a natural resin predominantly comprising abietyl amine; and n has a numerical value of between 2 and 3.

Of interest as pigment dispersants b) are also according to the invention those dioxazine compounds of the above-mentioned formula II, in which Q has the meaning given above;

$X^+$ is defined as an ammonium ion of the structure $N^+R^1R^2R^3R^4$, in which $R^1$ and $R^2$ jointly and together with the adjacent nitrogen atom form an aliphatic, heterocyclic five- or six-membered ring each having 1 to 3 identical or different hetero atoms (mainly nitrogen) belonging to the ring, such as, for example, of the pyrrolidone, imidazolidine, hexamethyleneimine, piperidine, piperazine or morpholine type, or in which $R^1$, $R^2$ and $R^3$ jointly and together with the adjacent nitrogen atom form an aromatic, heterocyclic five- or six-membered ring having 1 to 3 identical or different hetero atoms (mainly nitrogen) belonging to the ring and such a heteroaromatic can, if desired, additionally have a fused-on benzenoid ring, such as, for example, of the pyrrole, imidazole, pyridine, picoline, pyrazine, quinoline or isoquinoline type, and in which the R's on the nitrogen atom which do not contribute thereto are each hydrogen; and n is a numerical value of between 2 and 3.

Finally, those dioxazine compounds of the abovementioned formula III are regarded, according to the invention, as particularly valuable pigment dispersants c), in which Q has the feature described above;

$Z^{r+}$ is the cation $Ca^{2+}$ and therefore r is 2;

$Y^-$ is defined as the radical $R^6$-$SO_3^-$, in which $R^6$ is $C_8$-$C_{16}$-alkylphenyl, such as, for example, a dodecylphenyl group, or the radical $R^7$—COO—, in which $R^7$ is $C_{11}$-$C_{19}$-alkenyl which, if desired, is interrupted by a bridging member of the —CO— and/or —NR$^8$— ($R^8$ is H or $C_1$-$C_4$-alkyl)type, such as, for example, an oleylsarcosinate group based on natural oleic acid; and n is a numerical value of between 2 and 3 and p has a calculated numerical value of 1.

Some of the sulfo-containing dioxazine compounds of the formulae II and III used according to the invention as pigment dispersant b) and/or c) are described in the specialist literature. They can be prepared, for example, by known processes by sulfonation of the base pigment of the formula I with concentrated sulfuric acid or fuming sulfuric acid (oleum) and by sulfochlorination of the starting material mentioned with chlorosulfonic acid, followed by hydrolysis in water. Further conversion into the specific salts, salt-like derivatives derived therefrom or ammonium compounds is carried out such that the previously obtained sulfonic acids or alkali metal salts or alkaline earth metal salts thereof are reacted in aqueous or aqueous-organic, homogeneous or inhomogeneous phase at pH values in the range from 3 to 9 and at temperatures of between 0° and 100° C. with a metal salt or amine effecting the formation of the desired final product of the formula II. Salt formation can also take place in the presence of a dioxazine pigment of the formula I which is free from sulfo groups, i.e. if appropriate during the preparation of the base pigment.

The dispersant effect achievable according to the invention is based on a modification of the surface structure of the base pigment by uniform coating with the sulfo-containing dioxazine compounds of the formulae II and/or III. The effectiveness of the pigment dispersants and the quality of the pigment preparations produced therewith are, as a rule, dependent on the time at which the dispersant is added to the crude pigment and on the phase of the particular preparation process in which this admixture takes place. The manner of application of the pigment dispersions to the pigment also has a substantial effect in this respect.

The amount of dispersant required in the individual case depends, on the one hand, on the particle size, particle shape and surface condition of the base pigment and, on the other, on the space requirement of the pigment dispersants and the degree of pigment surface area available. The optimum concentration of the pigment dispersant in each case must be determined by orienting preliminary tests, since the improvement of the properties of the pigments does not always show a linear relationship with the amount of pigment dispersant. Maximum effectiveness is achieved if the pigment dispersant is firmly attached to the pigment surface.

The claimed pigment preparations can be produced in various ways. Thus, the dispersants can be added according to the invention, during the course of the preparation process of the preparation, to the base pigment as water-moist presscake before drying or as an already dry powder; specifically they can be added a) as early as the stage of pigment synthesis, such as, for example, to the reaction medium or preferably to the moist presscake of the base pigment, b) during a comminution process of the coarse-crystalline crude pigment, such as, for example, during b1) dry milling in the presence or absence of salt, b2) wet milling in the presence or absence of solvent, b3) reprecipitation from polyphosphoric acid, b4) conversion of the crude pigment into the salt form with sulfuric acid, the sulfuric acid concentration being selected such that no sulfonation takes place, 5) conversion of the crude pigment into the salt form with a mixture of hydrogen chloride and alcohols, 6) reprecipitation from aromatic sulfonic acids, 7) reprecipitation from halocarboxylic acids, c) to the already finely divided crude pigment before, during or after a subsequent solvent finish treatment, d) during mechanical mixing in dry form, such as, for example, of milled dispersants with the pigment powder and finally e) not until the pigment is incorporated in the intended application medium.

Preferred techniques suitable for producing the pigment preparations are according to the invention dry and wet milling. Addition of the pigment dispersants can take place, for example, in the course of dry milling of the crude pigment with or without additional milling auxiliaries in a roll or vibrating mill, or in the course of wet milling of the crude pigment in an aqueous, aqueous-organic or organic milling medium in a vibrating, roll or pearl mill. Aqueous milling in pearl mills has proven to be particularly suitable. The use of dispersants before or during a printing finish for the corresponding pigment in an aqueous, aqueous-acidic or aqueous-organic medium has proven to be equally reliable.

The amounts of pigment dispersants b) and/or c) to be added to base pigment a) during preparation according to the invention of the pigment preparations are not limited —insofar as the desired pigment quality is not adversely affected thereby—to a certain maximum value, although in general a dispersant content of 0.1 to 30% by weight, in particular 5 to 15% by weight, in each case based on the weight of the pigment, is possible.

In addition to pigment a) and pigment dispersants b) and/or c), the claimed pigment preparations can contain further components, such as, for example, surfactants, resins or dustproofing agents.

Accordingly, pigment preparations in the context of the present invention substantially comprise a) 99.5 to 70% by weight of the base pigment of the formula I, b) and c) 0.5 to 30% by weight of at least one of the dispersants of the formulae II and/or III, d) 0 to 5% by weight of a nonionic surfactant, and e) 0 to 5% by weight of customary additives, the percentages of the particular components being based on the total weight (100%) of the preparation.

The pigment preparations according to the invention can be used for pigmenting (coloring) high-molecular-weight organic materials of natural or synthetic origin: Examples of high-molecular-weight organic materials which can be colored by the claimed pigment preparations are cellulose ethers and esters, such as ethylcellulose, nitrocellulose, cellulose acetate or cellulose butyrate, natural resins or synthetic resins, such as polymerization resins or condensation resins, for example amino resins, in particular urea/- and melamine/formaldehyde resins, alkyd resins, acrylic resins, phenolic resins, polycarbonates, polyolefins, such as polystyrene, polyvinyl chloride, polyethylene, polypropylene, polyacrylonitrile, polyacrylic esters, polyamides, polyurethanes or polyesters, rubber, caseine, silicone and silicone resins, individually or in mixtures. It is irrelevant whether the high-molecular-weight organic compounds mentioned are present as plastic compositions, melts or in the form of spinning solutions, industrial or architectrual coatings or printing inks. Depending on the particular application, it has proven advantageous to use the pigment preparations according to the invention as toners or in the form of preparations or dispersions. Based on the high-molecular-weight organic material to be pigmented, the claimed pigment preparations are used in an amount of preferably 1 to 10% by weight.

Particularly preferred coating systems in this respect are baking finishs of the acrylic resin type. Further suitable coating systems are baking finishs from the class of alkyd/melamine resins and two-component paints based on acrylic resins crosslinkable with polyisocyanate. Of the large number of printing inks which can be pigmented, printing inks based on nitrocellulose may be mentioned in particular.

The pigment preparations according to the invention are easily dispersible in many application media and give high degrees of fineness. Dispersions of this type have high flocculation stability and show excellent rheological properties, even with a high degree of pigmenting. They can be used to obtain coatings and prints of high color strength, high gloss and high transparency and excellent fastness properties.

In order to test the properties of the claimed pigment preparations in the coating sector, an alkyd/melamine varnish (AM6) based on a medium-oil, non-drying alkyd resin comprising synthetic fatty acids and phthalic anhydride and on a melamine resin etherified with butanol and portions of a non-drying alkyd resin based on ricinenic acid (short-oil) and an acrylic baking finish based on a non-aqueous dispersion (TSA) are selected from the large number of known systems. In the examples which follow, they are referred to under the name AM6 and TSA.

The rheology of the millbase after dispersion is evaluated on the following scale from 1 to 5:

| 5 | thin liquid | 2 | slightly solidified |
| 4 | liquid | 1 | solidified |
| 3 | thick liquid | | |

After dilution of the millbase to the final pigment concentration, the viscosity was evaluated using a Rossmann viscospatula, type 301, from Erichsen. Gloss measurements were carried out on cast films at an angle of 10° according to DIN 67530 (ASTMD 523) using the multigloss measuring device from Byk-Mallinckrodt. The conductivity of the varnish was measured using a Randsburg cell.

In the examples below, parts of the substances thus described are by weight. The generic name used for identification of the dioxazine compound C.I. Pigment Violet 23 used according to the invention as colorant and the corresponding C.I. number 51319 are taken from the COLOUR INDEX, 3rd edition 1971, Volume 4.

EXAMPLE 1

30 g of coarse-crystalline crude pigment (Pigment Violet 23), prepared in salt-free form in accordance with BIOS Final Report 960, page 75, are placed in a cylindrical 1-liter plastic vessel which is filled with 1400 g of Cylpebs (made of corundum of diameter 12 mm, manufactured by GroSS GmbH, Hof) as the milling medium. 3 g of the pigment dispersant of the formula II, in which $X^+$ is an $H^+$ ion and n is the number 3, and 3 g of stearylamine are added to this mixture, which is then finely milled for 4 hours in a vibrating mill of the ®Vibratom type (manufactured by Siebtechnik Mühlheim) with shaking. The millbase is then removed from the milling medium by straining, giving 29 g of millbase. 29 g of the above millbase are introduced into 87.5 g of 85% isobutanol, and the mixture is initially stirred at 25° C. for 24 hours. After addition of 150 ml of water, the mixture is brought to boiling and left at this temperature for another 5 hours, after which the isobutanol is distilled off azeotropically by heating to up to 100° C. at the distillation head. The pigment preparation is then filtered off with suction, washed with water and dried at 80° C. This gives 27.9 g of a pigment preparation in which the dioxazine compound used as pigment dispersant is present after finishing as the stearylammonium salt of the formula II, in which $X^+$ is the group $N^+H_3[CH_2-(CH_2)_{16}-CH_3]$ and n is the number 3.

Upon testing the pigment preparation in AM6 varnish, transparent coatings of high color strength are obtained. The rheology of the composition is given a rating of 5. The gloss measurement gives a value of 80 and the viscosity is 3.3".

If, however, Example 1 is repeated without addition of the pigment dispersant, the product gives the following results: rheology a rating of 1-2, gloss value 23 and viscosity 7.1".

EXAMPLE 2

125 g of 85% isobutanol are initially introduced into a stirred vessel, and 7.5 g of the pigment dispersant of the formula II, in which $X^+$ is a cycloaliphatically substituted ammonium group based on a natural resin predominantly comprising abietylamine and n is the number 2, and 50 g of finely divided millbase (Pigment Violet 23), prepared according to Example 1 of U.S. Pat. No. 4,253,839 are added successively, and the mixture is initially stirred at 25° C. for 24 hours. 300 ml of water are then added, the mixture is brought to boiling and maintained at this temperature for another 5 hours. The isobutanol is then distilled off azeotropically by heating to up to 100° C. at the distillation head, and the pigment preparation is then filtered off with suction, washed with water and dried at 80° C. This gives 56.9 g of a pigment preparation which, when incorporated in TSA varnish, produces highly transparent coatings of high color strength. The rheology of the composition is given a rating of 5. The gloss value is 82 and the viscosity is 3.7".

If Example 2 is repeated without addition of the pigment dispersant, the product gives coatings which only have a low color strength and show extensive flocculation. The rheology then has a rating of 2, the gloss a value of 57 and the viscosity is 4.4".

EXAMPLE 3

175 g of 85% isobutanol are initially introduced into a stirred vessel, and 5 g of the pigment dispersant of the formula II, in which $X^+$ is an $H^+$ ion and n is the number 2, 5 g of oleylamine and 50 g of finely divided millbase (Pigment Violet 23) are added in succession as in Example 2, and the mixture is initially stirred at 25° C. for 24 hours. After addition of 300 ml of water, the mixture is brought to boiling and maintained at this temperature for another 5 hours. The isobutanol is then distilled off azeotropically by heating to up to 100° C. at the distillation head, the pigment preparation is then filtered off with suction, washed with water and dried at 80° C. This gives 52.4 g of a pigment preparation in which the dioxazine compound used as pigment dispersant is present after finishing as the oleylammonium salt of the formula II, in which $X^+$ is the group $N^+H_3[CH_2-(CH_2)_7-CH=CH-(CH_2)_7-CH_3]$ and n is the number 2.

Application of the product in nitrocellulose gravure printing produces prints of high color strength, high transparency and high gloss. When incorporated in AM6 varnish, it produces transparent coatings of high color strength. The rheology of the composition is given a rating of 4-5. The gloss value is 70 and the viscosity is 3.1".

If Example 3 is repeated without addition of the pigment dispersant, the following results are obtained for this product when incorporated in AM6 varnish: rheology rating 1-2, gloss value 20 and viscosity 7.0". In nitrocellulose gravure printing, the prints are clearly duller.

EXAMPLE 4

75 g of 85% isobutanol are initially introduced into a stirred vessel, and 50 g of finely divided millbase (Pigment Violet 23), as in Example 2 and 3.34 g of the pigment dispersant of the formula II, in which $X^+$ is an $Na^+$ ion and n is the number 2.2, as an 87.7% water-moist presscake are added in succession, and the mixture is brought to a pH of 3.5 by addition of 5.7 g of 98% formic acid. After stirring for half an hour, a solution of 2.25 g of a cycloaliphatic amine, based on a natural resin predominantly comprising abietylamine in 50 g of 85% isobutanol, is added dropwise over a period of a quarter of an hour. The mixture is then initially stirred at 25° C. for 24 hours, then brought to boiling and stirred at this temperature for another 5 hours. After removal of the isobutanol by azeotropic distillation by heating to up to 100° C. at the distillation head, the pigment preparation is filtered off with suction, washed neutral with water and dried at 80° C. This gives 43.2 g of a pigment preparation in which the dioxazine compound used as pigment dispersant is present after finishing as the abietylammonium salt of the formula II, in which $X^+$ is a cycloaliphatically substituted ammonium group based on a natural resin predominantly comprising abietylamine and n is the number 2.2.

When incorporated in TSA varnish, the product gives highly transparent coatings of high color strength. The rheology of the composition is given a rating of 5. The gloss has a value of 86 and the viscosity is 1.4".

If Example 4 is repeated without addition of the pigment dispersant, the coatings obtained with this product are clearly more covering and weaker. The rheology is then given a rating of 5. The gloss value is 63 and the viscosity is 1.8".

EXAMPLE 5

150 l of water are initially introduced into a stirred vessel, and 50 kg of coarse-crystalline crude pigment (Pigment Violet 23) in salt-free form as in Example 1 and 4.26 kg of the pigment dispersant of the formula II, in which $X^+$ is an $H^+$ ion and n is the number 2.6, as an 87.3% water-moist presscake are introduced in succession. The suspension formed is then passed nine times through a stirred ball mill of the ®Drais DCP-3 type (manufactured by Draiswerke GmbH, Mannheim), which is filled with 26.5 kg of zirconium mixed oxide pearls of diameter 0.3-0.4 mm as the milling medium, at a throughput of 130 kg/h and a rotation speed of 900 rpm. During milling, the viscosity of the suspension of the millbase is kept constant by addition in portions of 50 l of water. 250 g of the suspension formed of the millbase are initially introduced into a stirred vessel, 150 g of 100% isobutanol and 2 g of 3-diethylaminopropylamine are added, and the mixture is brought to a pH of 3.5 by addition of formic acid. The mixture is initially stirred at 25° C. for 24 hours, and then brought to boiling and stirred at this temperature for another 5 hours. The isobutanol is then distilled off azeotropically by heating to up to 100° C. at the distillation head, after which the pigment preparation is filtered off with suction, washed neutral with water and dried at 80° C. This gives 50.9 g of a pigment preparation in which the dioxazine compound used as pigment dispersant is present after finishing as the ammonium salt of the formula II, in which $X^+$ is the group $N^+H_3-CH_2-CH_2-CH_2-N(C_2H_5)_2$ and n is the number 2.6.

When incorporated in AM6 varnish, this product produces transparent coatings of high color strength. The rheology of the composition is given a rating of 3-4. The gloss has a value of 73 and the viscosity is 4.0".

If Example 5 is repeated without using the pigment dispersant, the product gives the following results: rheology rating 1-2, gloss value 20 and viscosity 7.9".

EXAMPLE 6

250 g of the suspension of the millbase, prepared according to Example 5, are initially introduced into a stirred vessel, 150 g of 100% isobutanol and 3 g of di-2-ethylhexylamine are added, and the mixture is initially stirred at 25° C. for 24 hours. The mixture is then brought to boiling and maintained at this temperature for another 5 hours with stirring. The isobutanol is then distilled off azeotropically by heating to up to 100° C. at the distillation head, after which the pigment preparation is filtered off with suction, washed neutral with water and dried at 80° C. This gives 52.1 g of a pigment preparation in which the dioxazine compound used as pigment dispersant is present after finishing as the ammonium salt of the formula II, in which $X^+$ is the group

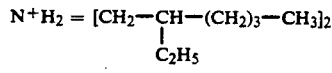

and n is the number 2.6.

When incorporated in AM6 varnish, this product gives transparent coatings of high color strength. The rheology of the composition is given a rating of 5. The gloss has a value of 71 and the viscosity is 3.3".

If Example 6 is repeated without using the pigment dispersant, the product gives the following results: rheology rating 1-2, gloss value 23 and viscosity 5.8".

EXAMPLE 7

250 g of the suspension of the millbase, prepared according to Example 5, are initially introduced into a stirred vessel, 150 g of 100% isobutanol and 1.3 g of triethylamine are added, and the mixture is initially stirred at 25° C. for 24 hours. The mixture is then brought to boiling and maintained at this temperature for another 5 hours with stirring. The isobutanol is then distilled off azeotropically by heating to up to 100° C. at the distillation head, after which the pigment preparation is filtered off with suction, washed neutral with water and dried at 80° C. This gives 49.7 g of a pigment preparation in which the dioxazine compound used as pigment dispersant is present after finishing as the ammonium salt of the formula II, in which $X^+$ is the group $N^+H\equiv(C_2H_5)_3$ and n is the number 2.6.

When incorporated in TSA varnish, this product gives transparent coatings of high color strength. The rheology of the composition is given a rating of 5. The gloss has a value of 70 and the viscosity is 4.0".

If Example 7 is repeated without using the pigment dispersant, the product gives the following results: rheology rating 5, gloss value 41 and viscosity 4.0".

EXAMPLE 8

500 g of the suspension of the millbase, prepared according to Example 5, are initially introduced into a stirred vessel, and a solution of 300 g of 100% isobutanol and 7.1 g of a cycloaliphatic amine based on a natural resin predominantly comprising abietylamine is added. The mixture is initially stirred at 25° C. for 24 hours, then brought to boiling and stirred at this temperature for another 5 hours. The isobutanol is then distilled off azeotropically by heating to up to 100° C. at the distillation head, after which the pigment preparation is filtered off with suction, washed with water and dried at 80° C. This gives 106.3 g of a pigment preparation in which the dioxazine compound used as pigment dispersant is present after finishing as the ammonium salt of the formula II, in which $X^+$ is a cycloaliphatically substituted ammonium group based on a natural resin predominantly comprising abietylamine and n is the number 2.6.

Upon testing the pigment preparation with AM6 varnish, transparent coatings of high color strength are obtained. The rheology of the composition is given a rating of 5, the gloss has a value of 83, the viscosity is 2.8" and the conductivity of the pigmented varnish is 0.7 microsiemens. The cross-coating fastness is excellent.

If Example 8 is repeated, however, without using the pigment dispersant, the rheology of this product when incorporated in AM6 varnish reaches a rating of 3, the gloss value is 30, the viscosity 5.9" and the conductivity of the pigmented varnish 0.8 microsiemens.

When incorporated in TSA varnish, the pigment preparation also gives transparent coatings of high color strength. The rheology of the composition is given a rating of 4-5. The gloss has a value of 83, the viscosity is 10.7" and the conductivity 0.45 microsiemens. The cross-coating fastness is excellent. The pigment preparation does not show flocculation. In contrast, without participation of the pigment dispersant, the coatings produced with TSA varnish have a much lower color strength. Such a pigment shows extensive flocculation. The rheology then has a rating of 4-5, the gloss value is 48, the conductivity is 0.5 microsiemens and the viscosity is 8.8".

EXAMPLE 9

7.5 g of the pigment dispersant of the formula II, in which $X^+$ is an $H^+$ ion and n is the number 2, are introduced into 210 ml of water and dissolved by heating to 60° C. Furthermore, a solution of 2.2 g of calcium chloride (anhydrous) in 20 ml of deionized water is then added to this solution, and the mixture is then stirred at 60° C. for another hour. A solution of 3.3 g of dodecylbenzene-4-sulfonic acid and 20 ml of ethanol are then added dropwise, after which the mixture is again stirred at 60° C. for 1 hour, and the product formed is then filtered off with suction, washed chloride-free with water and dried at 80° C. This gives 10.8 g of a pigment dispersant which now, after the reaction, has a salt-like structure in accordance with the formula III, in which $Z^{2+}$ (if r is 2) is the cation $Ca^{2+}$ and $Y^-$ the group

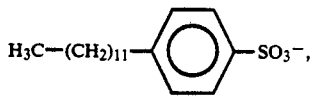

p has the value 1 and n is the number 2.

2 g of this pigment dispersant are mixed mechanically with 18 g of fine-crystalline Pigment Violet 23. A pigment preparation is obtained which, when incorporated in AM6 varnish, produces transparent coatings of high color strength.

EXAMPLE 10

250 g of the suspension of the millbase, prepared according to Example 5, are charged in a stirred vessel with 1.3 g of calcium chloride (anhydrous), and the mixture is initially stirred at 25° C. for 1 hour, after which a solution of 3.9 g of sodium oleylsarcosinate, based on natural oleic acid, and 150 ml of 100% isobutanol is added dropwise to this mixture. The mixture is then brought to boiling and maintained at the boiling temperature for another 5 hours with stirring. After the isobutanol has been distilled off azeotropically by heating to up to 100° C. at the distillation head, the pigment preparation is finally filtered off with suction, washed chloride-free with water and dried at 80° C. This gives 53.6 g of a pigment preparation in which the dioxazine compound used as pigment dispersant now, after the reaction, has a salt-like structure in accordance with the formula III, in which $Z^{r+}$ (if r is 2) is the cation $Ca^{2+}$ and $Y^-$ is an oleylsarcosinate group, based on a natural oleic acid, p has the value 1 and n is the number 2.6.

When incorporated in TSA varnish, this product gives transparent coatings of high color strength. The rheology of the composition is given a rating of 5. The gloss value is 72 and the viscosity is 3.9".

If, however, Example 10 is repeated without the pigment dispersant, coatings of only low color strength, which show extensive flocculation, are obtained with this product.

EXAMPLE 11

1 g of the pigment dispersant of the formula II, in which $X^+$ is an $H^+$ ion and n is the number 2, is mechanically mixed with 19 g of fine-crystalline Pigment Violet 23.

When incorporated in TSA varnish, transparent coatings of high color strength are obtained with this pigment preparation.

EXAMPLE 12

30 g of coarse-crystalline crude pigment (Pigment Violet 23) in salt-free form as in Example 1 are placed in a cylindrical 1-liter plastic vessel, which is filled with 1400 g of Cylpebs (composition as in Example 1) as the milling medium. 3 g of the pigment dispersant of the formula II, in which $X^+$ is an $H^+$ ion and n is the number 3, and 3 g of calcium chloride (anhydrous) are added to this mixture, which is then finely milled for 4 hours under the action of a vibrating mill (of the same type as in Example 1). The milling medium is then removed from the millbase by screening, giving 32 g of millbase. 32 g of the above millbase are introduced into 87.5 g of 85% isobutanol, and the mixture is initially stirred at 25° C. for 24 hours. After addition of 150 ml of water, the mixture is brought to boiling and left at this temperature for another 5 hours, after which the isobutanol is distilled off azeotropically by heating to up to 100° C. at the distillation head. The pigment preparation is then filtered off with suction, washed with water and dried at 80° C. This gives 28.5 g of a pigment preparation in which the dioxazine compound used as pigment dispersant is present after finishing as the calcium salt of the formula II, in which $X^+$ is the metal cation $Ca^{2+}/2$ and n is the number 3. Upon testing the pigment preparation with AM6 varnish, transparent coatings of high color strength are obtained. The rheology of the composition is given a rating of 5. The gloss value is 60 and the viscosity is 2.6".

EXAMPLE 13

30 g of coarse-crystalline crude pigment (Pigment Violet 23) as in Example 1 but containing 26.6% of salt from the synthesis are placed in a cylindrical 1-liter plastic vessel, which is filled with 1400 g of Cylpebs (composition as in Example 1) as the milling medium. 1.1 g of the pigment dispersant of the formula II, in which $X^+$ is an $H^+$ ion and n is the number 2, and 0.8 g of stearylamine are added to this mixture, which is then finely milled for 4 hours under the action of a vibrating mill (of the same type as in Example 1). The milling medium is then removed from the millbase by screening, giving 27.3 g of millbase. 27.3 g of the above millbase are introduced into 87.5 g of 85% isobutanol, and the mixture is initially stirred at 25° C. for 24 hours. After addition of 150 ml of water, the mixture is brought to boiling and maintained at this temperature for another 5 hours. The isobutanol is then distilled off azeotropically by heating to up to 100° C. at the distillation head, and the pigment preparation is then filtered off with suction, washed with water and dried at 80° C. This gives 18.8 g of a pigment preparation in which the dioxazine compound used as pigment dispersant is present after finishing as the stearylammonium salt of the formula II, in which $X^+$ is the group $N^+H_3[CH_2-(CH_2)_{16}-CH_3]$ and n is the number 2.

Upon testing of this pigment preparation with PVC, transparent colorations of high color strength are obtained. The bleeding fastness is excellent.

EXAMPLE 14

400 g of polyphosphoric acid ($P_2O_5$ content 84%) are initially introduced into a stirred vessel, heated to 60° C., and 33.5 g of coarse-crystalline crude pigment (Pigment Violet 23), prepared in salt-free form as in Example 1, are introduced into this mixture over a period of 1 hour. The mixture is then heated to 80° C. and stirred at this temperature for another 4 hours. The resulting solution is then poured into a mixture of 1000 ml of water and 1750 g of ice, and the mixture is stirred for another 2 hours, after which the precipitated product is filtered off with suction and washed neutral with water. The moist presscake formed is then initially stirred with 200 ml of water, a solution of 100 ml of water and 2.8 g of the pigment dispersant of the formula II, in which X+ represents an Na+ ion and n is the number 2.2, is then added as an 87.7% water-moist presscake, and the mixture is stirred at 25° C. for 1 hour. A solution of 240 g of 85% isobutanol and 2.1 g of a cycloalphatic amine based on a natural resin predominantly comprising abietylamine is then added, and the mixture is boiled for 5 hours while stirring is continued. The isobutanol is then distilled off azeotropically by heating to up to 100° C. at the distillation head, after which the pigment preparation is filtered off with suction, washed neutral with water and dried at 80° C. This gives 36.7 g of a pigment preparation in which the dioxazine compound used as pigment dispersant is present after the reaction as the ammonium salt of the formula II, in which X+ is a cycloaliphatically substituted ammonium group based on a natural resin, which predominantly comprises abietylamine, and n is the number 2.2.

Upon testing the pigment preparation with AM6 varnish, highly transparent coatings of high color strength are obtained.

We claim:

1. A pigment preparation which consists essentially of
a) a dioxazine compound of the formula I as base pigment

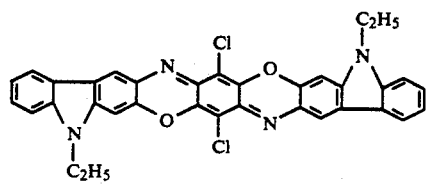

and, at least one pigment dispersant selected from
b) a dioxazine compound of the formula II $$Q\text{---}[\text{---}SO_3^-X^+]_n \qquad (II)$$

in which

Q is an n-valent radical of the base structure of the formula I;

X+ is an ammonium ion having the structure N+R$^1$R$^2$R$^3$R$^4$, in which the substituents R$^1$, R$^2$, R$^3$ and R$^4$ on the quaternary nitrogen atom are individually and independently of one another each one of the groups $C_5$–$C_{30}$-cycloalkyl, which is optionally substituted by hydroxyl, di-($c_1$–$C_4$-alkyl)amino, carboxyl or carboxamide, or a (poly)alkyleneoxy group of the —(CH-R$^5$—CH$_2$—O—)$_k$—H type, in which R$^5$ is hydrogen or $C_1$–$C_4$-alkyl and k is a number from 1 to 30;

or in which the substituents R$^1$ and R$^2$ jointly and together with the adjacent nitrogen atom can form an aliphatic, five- to seven-membered heterocyclic system, which optionally contains further hetero atoms;

or in which the substituents R$^1$ and R$^2$ jointly and together with the adjacent nitrogen atom can form an aromatic, five- to seven-membered heterocyclic system, which optionally contains further hetero atoms and additionally benzo-fused rings, while each of the R's not participating in the two forms described above of the cyclic ammonium ion is hydrogen;

and in which n is a numerical value between 1 and 4; and
c) a dioxazine compound of the formula III $$Q\text{---}[\text{---}SO_3^-Z^{r+}{}_pY^-]_n \qquad (III)$$

in which

Q is an n-valent radical of the base structure of the formula I;

Z++ is the equivalent M$^{r+}$ of an r-valent metal cation, where r is then identically for the case in question the number 2 or 3;

Y$^-$ is one of the anionic radicals R$^6$—SO$_3^-$ or R$^7$—COO$^-$, in which the substituents R$^6$ and R$^7$, independently of one another, are each one of the groups $C_1$–$C_{30}$-alkyl or $C_2$–$C_{30}$-alkenyl, which in turn can be interrupted by a bridge-forming grouping selected from the series consisting of —O—, —NH—, NR$^8$—, —S—, phenylene, —CO—, —SO$_2$—, —CHR$^9$— or —CR$^9$R$^{10}$—, or by a combination of such bridging members of different types, which can be repeating, and in which R$^8$, R$^9$ and R$^{10}$ are identical or different $C_1$–$C_4$-alkyl, or furthermore is phenyl, $C_1$–$C_{30}$-alkyl-substituted phenyl or $C_1$–$C_4$-alkoxy-substituted phenyl or a combination thereof or a (poly)alkyleneoxy group of the —(CHR$^{11}$—CH$_2$—O—)$_k$—H type, in which R$^{11}$ is hydrogen or $C_1$–$C_4$-alkyl and k is a number from 1 to 30;

and in which n is a numerical value between 1 and 4 and
p is a numerical value which can be calculated from the difference (r−1);

in which if components X, Y and Z are present more than once (n>1) in the compounds of formulae II or III or in the compounds of formulae II and III, the meanings of the symbols just mentioned do not have to be identical.

2. A pigment preparation as claimed in claim 1, wherein the pigment dispersant b) present is a dioxazine compound of the formula II given there, in which X+ is an ammonium ion of the structure N+$H_3$R$^4$, in which R$^4$ is $C_{20}$-cycloalkyl based on a natural resin; and n is a numerical value of between 2 and 3.

3. A pigment preparation as claimed in claim 1, wherein the pigment dispersant b) present is a dioxazine compound of the formula II given there, in which X+ is an ammonium ion of the structure N+R$^1$R$^2$R$^3$R$^4$, in which R$^1$ and R$^2$ jointly and together with the adjacent nitrogen atom form an aliphatic, heterocyclic five- or six-membered ring each having 1 to 3 identical or different hetero atoms belonging to the ring, or in which R$^1$, R$^2$ and R$^3$ jointly and together with the adjacent nitrogen atom form an aromatic, heterocyclic five- or six-membered ring having 1 to 3 identical or different hetero atoms belonging to the ring and such a heteroaromatic optionally additionally contains a fused-on benzenoid ring, and in which the R's on the nitrogen atom not contributing thereto are each hydrogen; and n is a numerical value of between 2 and 3.

4. A pigment preparation as claimed in claim 1, wherein the pigment dispersant c) present is a dioxazine compound of the formula III given there, in which Z$^{r+}$ is a Ca$^{2+}$ cation and r is therefore 2;

$Y^-$ is the radical $R^6$—$SO_3^-$, in which $R^6$ is $C_8$–$C_{16}$—alkylphenyl, or the radical $R^7$—$COO^-$, in which $R^7$ is $C_{11}$–$C_{19}$-alkenyl; and n is a numerical value of between 2 and 3 and p has a calculated numerical value of 1.

5. A pigment preparation as claimed in claim 1, which essentially consists of
   a) 99.5 to 70% by weight of the base pigment of the formula I,
   b) and c) 0.5 to 30% by weight of at least one of the dispersants of the formulae II, or III, or II and III,
   d) 0 to 5% by weight of a nonionic surfactant, and
   e) 0 to 5% by weight of customary additives, the percentages of the particular components being based on the total weight (100%) of the preparation.

6. A process for the preparation of a pigment preparation defined as claimed in claim 1, which comprises uniformly coating the surface structure of the base pigment a) with one or more pigment dispersants b) or c) or a combination thereof.

7. The process as claimed in claim 6, wherein pigment dispersants b) or c) or a combination thereof are added to the coarse crystalline crude pigment a) during its comminution in the course of dry milling or wet milling.

8. The process as claimed in claim 6, wherein pigment dispersants b) or c) or a combination thereof are added to the watermoist presscake of base pigment a).

9. The process as claimed in claim 6, wherein pigment dispersants b) or c) or a combination thereof are added to the finely divided base pigment a) in the course of a solvent finish treatment.

10. The process as claimed in claim 6, wherein pigment dispersants b) or c) or a combination thereof are mixed mechanically in dry form with the finely divided base pigment a).

* * * * *

UNITED STATES PATENT AND TRADEMARK OFFICE
CERTIFICATE OF CORRECTION

PATENT NO. : 5,275,653
DATED : January 4, 1994
INVENTOR(S) : Dietz et al.

It is certified that error appears in the above-indentified patent and that said Letters Patent is hereby corrected as shown below:

On the title page, Section [56], in the FOREIGN PATENT DOCUMENTS subsection, the last document should be --0395988 11/1990 European Pat. Off.--.

Column 13, line 51, "di-($c_1$-$C_4$-alkyl) amino" should be --di-($C_1$-$C_4$-alkyl) amino--.

Column 14, line 10, please change "$Z^{++}$" to --$Z^{r+}$--.

Column 14, line 43, please change "$N^{+H3}R^4$" to --$N^+H_3R^4$--.

Signed and Sealed this

Twenty-sixth Day of July, 1994

*Attest:*

BRUCE LEHMAN

*Attesting Officer*     *Commissioner of Patents and Trademarks*